United States Patent
Nakano

(10) Patent No.: US 7,546,111 B2
(45) Date of Patent: Jun. 9, 2009

(54) MOBILE COMMUNICATION SYSTEM AND WIRELESS BASE STATION DEVICE

(75) Inventor: Yoshihisa Nakano, Saitama (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 478 days.

(21) Appl. No.: 11/356,226

(22) Filed: Feb. 17, 2006

(65) Prior Publication Data

US 2006/0189317 A1 Aug. 24, 2006

(30) Foreign Application Priority Data

Feb. 18, 2005 (JP) ............................. 2005-042810

(51) Int. Cl.
*H04M 11/04* (2006.01)
*H04M 1/00* (2006.01)
*H04Q 7/20* (2006.01)

(52) U.S. Cl. .............. 455/404.1; 455/456.1; 455/456.5; 455/452.1

(58) Field of Classification Search ............... 455/404.1, 455/522, 435, 452.1, 456.5, 440; 370/335
See application file for complete search history.

(56) References Cited

U.S. PATENT DOCUMENTS

| | | | | |
|---|---|---|---|---|
| 2003/0109254 A1* | 6/2003 | Motegi et al. | ............... | 455/435 |
| 2003/0134654 A1* | 7/2003 | Masuda et al. | ............... | 455/522 |
| 2004/0136336 A1* | 7/2004 | Nakamura et al. | ........... | 370/328 |
| 2006/0029021 A1* | 2/2006 | Sakawa et al. | ............... | 370/331 |

FOREIGN PATENT DOCUMENTS

JP 2001-258058 A 9/2001
JP 2003-174665 A 6/2003

* cited by examiner

*Primary Examiner*—Charles N Appiah
*Assistant Examiner*—Kiet Doan
(74) *Attorney, Agent, or Firm*—Venable LLP; James R. Burdett

(57) ABSTRACT

A mobile communication system with which the time required for handover is short and which has a superior network operating efficiency. In the mobile communication system of the present invention, each wireless base station measures the strength of the radio waves received from a wireless terminal irrespective of whether or not the destination of the radio waves is the wireless base station itself. The respective wireless base stations mutually provide the radio wave strength measurement result. The wireless base stations replies to the request for handover from wireless terminal only when the radio wave of itself is strongest. In addition, when the processing load is large, the wireless base station selects another wireless base station for which the radio wave strength from the wireless terminal is large and switches the connection.

15 Claims, 14 Drawing Sheets

| record access point | communication access point | wireless network terminal | previous measurement time | previous measured strength | current measurement time | current measured strength |
|---|---|---|---|---|---|---|
| 111 | 111 | 131 | 10:13:20 | -60dbm | 10:14:00 | -70dbm |
| ... | ... | ... | ... | ... | ... | ... |

FIG. 7

| record access point | communication access point | wireless network terminal | previous measurement time | previous measured strength | current measurement time | current measured strength |
|---|---|---|---|---|---|---|
| 111 | 111 | 131 | 10:13:20 | -60dbm | 10:14:00 | -70dbm |
| ... | ... | ... | ... | ... | ... | ... | wireless base station 111

| record access point | communication access point | wireless network terminal | previous measurement time | previous measured strength | current measurement time | current measured strength |
|---|---|---|---|---|---|---|
| 112 | 111 | 131 | 10:13:20 | -60dbm | 10:14:00 | -65dbm |
| ... | ... | ... | ... | ... | ... | ... | wireless base station 112

| record access point | communication access point | wireless network terminal | previous measurement time | previous measured strength | current measurement time | current measured strength |
|---|---|---|---|---|---|---|
| 113 | 111 | 131 | 10:13:20 | -70dbm | 10:14:00 | -60dbm |
| 113 | 114 | 132 | 10:13:20 | -60dbm | 10:14:00 | -60dbm |
| ... | ... | ... | ... | ... | ... | ... | wireless base station 113

| record access point | communication access point | wireless network terminal | previous measurement time | previous measured strength | current measurement time | current measured strength |
|---|---|---|---|---|---|---|
| 114 | 114 | 132 | 10:13:20 | -55dbm | 10:14:00 | -55dbm |
| ... | ... | ... | ... | ... | ... | ... | wireless base station 114

FIG. 8

| record access point | communication access point | wireless network terminal | previous measurement time | previous measured strength | current measurement time | current measured strength |
|---|---|---|---|---|---|---|
| 111 | 111 | 131 | 10:13:20 | -60dbm | 10:14:00 | -70dbm |
| 112 | 111 | 131 | 10:13:20 | -60dbm | 10:14:00 | -65dbm |
| 113 | 111 | 131 | 10:13:20 | -70dbm | 10:14:00 | -60dbm |
| 113 | 114 | 132 | 10:13:20 | -60dbm | 10:14:00 | -60dbm |
| 114 | 114 | 132 | 10:13:20 | -55dbm | 10:14:00 | -55dbm |
| ... | ... | ... | ... | ... | ... | ... | wireless base station 111

| record access point | communication access point | wireless network terminal | previous measurement time | previous measured strength | current measurement time | current measured strength |
|---|---|---|---|---|---|---|
| 111 | 111 | 131 | 10:13:20 | -60dbm | 10:14:00 | -70dbm |
| 112 | 111 | 131 | 10:13:20 | -60dbm | 10:14:00 | -65dbm |
| 113 | 111 | 131 | 10:13:20 | -70dbm | 10:14:00 | -60dbm |
| 113 | 114 | 132 | 10:13:20 | -60dbm | 10:14:00 | -60dbm |
| 114 | 114 | 132 | 10:13:20 | -55dbm | 10:14:00 | -55dbm |
| ... | ... | ... | ... | ... | ... | ... | wireless base station 112

| record access point | communication access point | wireless network terminal | previous measurement time | previous measured strength | current measurement time | current measured strength |
|---|---|---|---|---|---|---|
| 111 | 111 | 131 | 10:13:20 | -60dbm | 10:14:00 | -70dbm |
| 112 | 111 | 131 | 10:13:20 | -60dbm | 10:14:00 | -65dbm |
| 113 | 111 | 131 | 10:13:20 | -70dbm | 10:14:00 | -60dbm |
| 113 | 114 | 132 | 10:13:20 | -60dbm | 10:14:00 | -60dbm |
| 114 | 114 | 132 | 10:13:20 | -55dbm | 10:14:00 | -55dbm |
| ... | ... | ... | ... | ... | ... | ... | wireless base station 113

| record access point | communication access point | wireless network terminal | previous measurement time | previous measured strength | current measurement time | current measured strength |
|---|---|---|---|---|---|---|
| 111 | 111 | 131 | 10:13:20 | -60dbm | 10:14:00 | -70dbm |
| 112 | 111 | 131 | 10:13:20 | -60dbm | 10:14:00 | -65dbm |
| 113 | 111 | 131 | 10:13:20 | -70dbm | 10:14:00 | -60dbm |
| 113 | 114 | 132 | 10:13:20 | -60dbm | 10:14:00 | -60dbm |
| 114 | 114 | 132 | 10:13:20 | -55dbm | 10:14:00 | -55dbm |
| ... | ... | ... | ... | ... | ... | ... | wireless base station 114

FIG. 10A

| record access point | communication access point | wireless network terminal | previous measurement time | previous measured strength | current measurement time | current measured strength |
|---|---|---|---|---|---|---|
| A → 111 | 111 | 131 | 10:13:20 | -60dbm | 10:14:00 | -70dbm |
| 112 | 111 | 131 | 10:13:20 | -60dbm | 10:14:00 | -65dbm |
| 113 | 111 | 131 | 10:13:20 | -70dbm | 10:14:00 | -60dbm |
| 113 | 114 | 132 | 10:13:20 | -60dbm | 10:14:00 | -60dbm |
| 114 | 114 | 132 | 10:13:20 | -55dbm | 10:14:00 | -55dbm |
| ... | ... | ... | ... | ... | ... | ... |

FIG. 10B

| record access point | communication access point | wireless network terminal | previous measurement time | previous measured strength | current measurement time | current measured strength |
|---|---|---|---|---|---|---|
| A → 111 | 111 | 131 | 10:13:20 | -60dbm | 10:14:00 | -70dbm |
| B → 112 | 111 | 131 | 10:13:20 | -60dbm | 10:14:00 | -65dbm |
| C → 113 | 111 | 131 | 10:13:20 | -70dbm | 10:14:00 | -60dbm |
| 113 | 114 | 132 | 10:13:20 | -60dbm | 10:14:00 | -60dbm |
| 114 | 114 | 132 | 10:13:20 | -55dbm | 10:14:00 | -55dbm |
| ... | ... | ... | ... | ... | ... | ... |

| record access point | communication access point | wireless network terminal | previous measurement time | previous measured strength | current measurement time | current measured strength |
|---|---|---|---|---|---|---|
| 111 | 111 | 131 | 10:13:20 | -60dbm | 10:14:00 | -50dbm |
| 112 | 111 | 131 | 10:13:20 | -60dbm | 10:14:00 | -65dbm |
| 113 | 111 | 131 | 10:13:20 | -65dbm | 10:14:00 | -70dbm |
| 111 | 111 | 132 | 10:13:20 | -60dbm | 10:14:00 | -70dbm |
| 112 | 111 | 132 | 10:13:20 | -55dbm | 10:14:00 | -55dbm |
| 111 | 111 | 133 | 10:13:20 | -63dbm | 10:14:00 | -60dbm |
| 113 | 111 | 133 | 10:13:20 | -55dbm | 10:14:00 | -58dbm |
| ... | ... | ... | ... | ... | ... | ... |

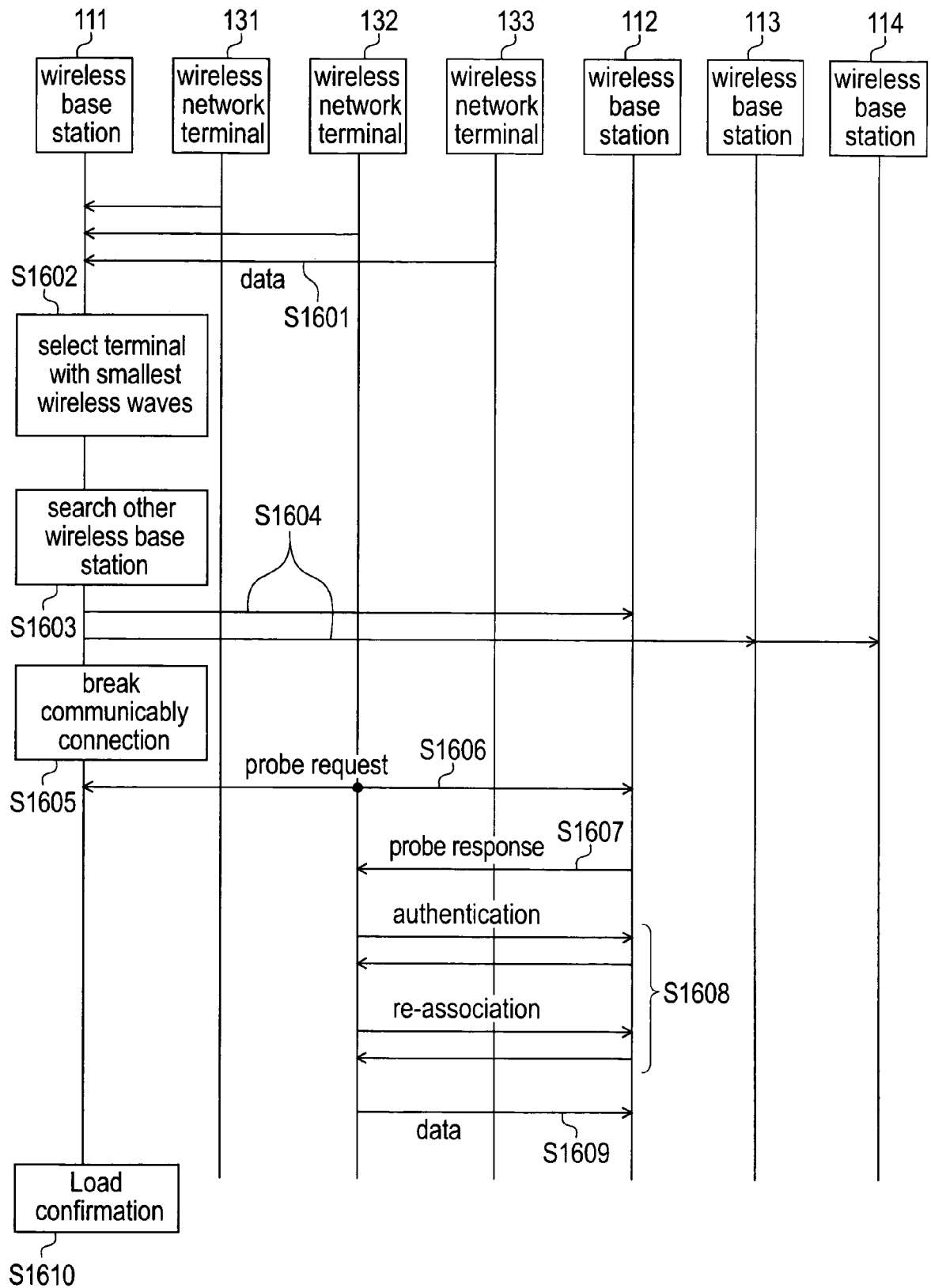

MOBILE COMMUNICATION SYSTEM AND WIRELESS BASE STATION DEVICE

BACKGROUND OF THE INVENTION

1. Field of the Invention

The present invention relates to a mobile communication system that comprises a plurality of wireless base stations, a network that communicably connects the wireless base stations and a wireless network terminal that communicates wirelessly with the wireless base stations. More particularly, the present invention relates to improvements in a wireless base station that is contained in such a mobile communication system. The present invention can be applied to a Cellular Mobile Telephone System, PHS (Personal Handyphone System), or the like, for example. In addition, the present invention can be applied to wireless LAN (Local Area Network) that employs PDA (Personal Digital Assistance) and mobile computers, or the like, as communication terminals, to wireless communication systems based on Bluetooth® and digital wireless communication systems based on Zigbee®, or the like.

2. Description of Related Art

Mobile communication systems comprise a plurality of wireless base stations that communicate with wireless network terminals and wired networks that communicably connect the wireless base stations. Wireless base station being communicably connected to the wireless network terminal is called an 'access point'.

The radio wave strength when the wireless network terminal and wireless base station are communicating is desirably sufficiently large. When the radio wave strength is smaller than a predetermined value, the wireless network terminal is unable to communicate with the wireless base station. Therefore, the wireless network terminal searches for an access point at which the radio wave strength reaches a maximum when the wireless network terminal is communicably connected to the wired network. Further, when the radio wave strength is smaller than a predetermined threshold value in accordance with the movement of the wireless network terminal, the wireless network terminal switches the access point with which the wireless network terminal is communicably connected. The switching is known as handover. Handover technology is disclosed in Japanese laid-open application publication No. 2001-258058, for example.

When performing handover, the wireless network terminal wirelessly transmits a probe request signal. The wireless base stations that receive a probe request signal transmit probe response signals to the wireless network terminal. In many cases, the wireless network terminal receives the probe response signals from a plurality of wireless base stations. The wireless network terminal measures the radio wave strength of the received probe response signals and selects the signal with the largest radio wave strength. Further, the wireless network terminal selects the wireless base station that transmitted the probe response signal with the largest strength as the new access point.

As mentioned above, the wireless network terminal measures the strength of all the received probe response signals. Therefore, the more wireless base stations that transmit a probe response signal, the longer then time required for the selection processing. When the processing time is very long, there is the risk that the radio wave strength between the access point and the wireless network terminal will fall below than the radio wave strength required for the communication connection before handover is complete. When the radio wave strength is inadequate, the communication connection is broken.

The wireless network terminal always selects the wireless base station corresponding with the largest signal even when a plurality of probe signals with slightly different radio wave strengths are received. As a result, when a plurality of wireless base stations is placed in the vicinity, there is the possibility of a concentration of a multiplicity of wireless connections with a small number of wireless base stations. The phenomenon whereby only the processing load of some of the wireless base stations increases brings about a deterioration of the operating efficiency of the network.

Some kinds of the mobile communication system such as PHS uses information indicating the position of each access point when handover is performed. A technology for registering the positions of the access points is disclosed in Japanese laid-open application publication No. 2003-174665, for example. This technology identifies the positions of access points by using a GPS (Global Positioning System). By using a GPS, registration can be automatically performed in a short time. On the other hand, the use of a GPS involves a huge cost increase.

SUMMARY OF THE INVENTION

An object of the present invention is to inexpensively provide a mobile communication system with which the time required for handover is short and which has a superior network operating efficiency.

For this reason, the mobile communication system according to the present invention comprises a wireless base station that measures the strength of radio waves received from a wireless terminal irrespective of whether or not the destination of the radio waves is the wireless base station itself; a communication network that communicably connects between the wireless base station and other wireless base stations; and a controller that creates a terminal management table that contains identification information on the wireless base station itself that measures the radio wave strength, identification information on the wireless base station corresponding to the destination of the radio waves, identification information on the wireless terminal that transmits the radio waves, and the radio wave strength measurement result, and that combines the terminal management table thus created and terminal management tables received from the other wireless base stations by using the communication network.

BRIEF DESCRIPTION OF THE DRAWINGS

Further objects and advantages of the present invention will be described with reference to the attached drawings which follow.

FIGS. 5, 6, 7, 8, 9, 10A, 10B, and 11 serve to illustrate the relative position identification function of the mobile communication system according to the embodiment;

FIGS. 14, 15, and 16 serve to illustrate the load distribution function of the mobile communication system according to the embodiment.

DESCRIPTION OF THE PREFERRED EMBODIMENTS

An embodiment of the present invention will be described hereinbelow by using the drawings. The size, shape, and dispositional relationship of the respective components are merely shown schematically to the extent of permitting an understanding of the present invention and the numerical conditions described hereinbelow only serve as examples.

The mobile communication system of the present embodiment comprises one or a plurality of domains. Each domain has a plurality of wireless base stations and a wired network that communicably connects the wireless base stations. The mobile communication system is constituted by mutually connecting the wired networks of each domain.

Figure 1:
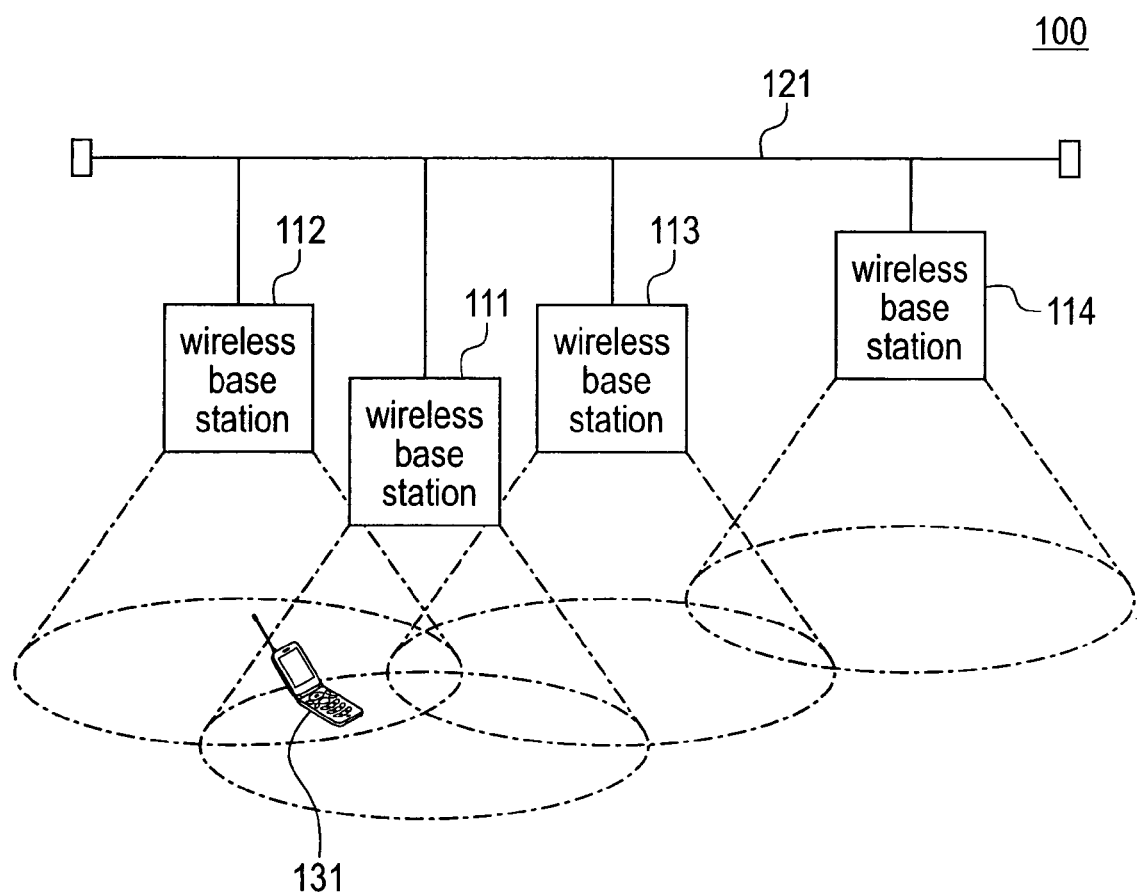
FIG. 1 is a conceptual view of the constitution of one domain of the mobile communication system according to an embodiment.

FIG. 1 schematically shows the constitution of one domain of the mobile communication system according to the present embodiment. As shown in FIG. 1, the mobile communication system 100 comprises wireless base stations 111 to 114, a wired network 121, and a wireless network terminal 131. The mobile communication system 100 comprises a multiplicity of wireless base stations but, in order to simplify the description, only four wireless base stations 111 to 114 are shown in FIG. 1.

The wireless base stations 111 to 114 can be communicably connected to the wireless network terminal 131 located within range of the wireless radio waves (that is, a range in which the strength of the wireless radio waves is equal to or more than a predetermined value). FIG. 1 shows that the radio wave ranges of each of the respective wireless base stations 111 to 114 by means of a dotted line. In addition, the wireless base stations 111 to 114 are communicably connected to other wireless base stations via the wired network 121. As the wireless base stations 111 to 114, devices that are installed fixed to the wall or ceiling, devices that can be easily attached and removed, and devices that are installed in moving means such as push cars, or the like, can be employed. The internal constitution of the wireless base stations 111 to 114 will be described subsequently by using FIG. 2.

The wired network 121 is communicably connects the wireless base stations 111 to 114 each other. The wired network 121 is constructed by using optic cable, for example.

The wireless network terminal 131 is communicably connected to any of the wireless base stations 111 to 114. When the position of the wireless network terminal 131 is within the radio wave range of a plurality of the wireless base stations, the wireless network terminal 131 is communicably connected to any one of the wireless base stations. A mobile-type personal computer, cellular phone, PHS terminal, or PDA terminal or the like, for example, can be used as the wireless network terminal 131.

Figure 2:
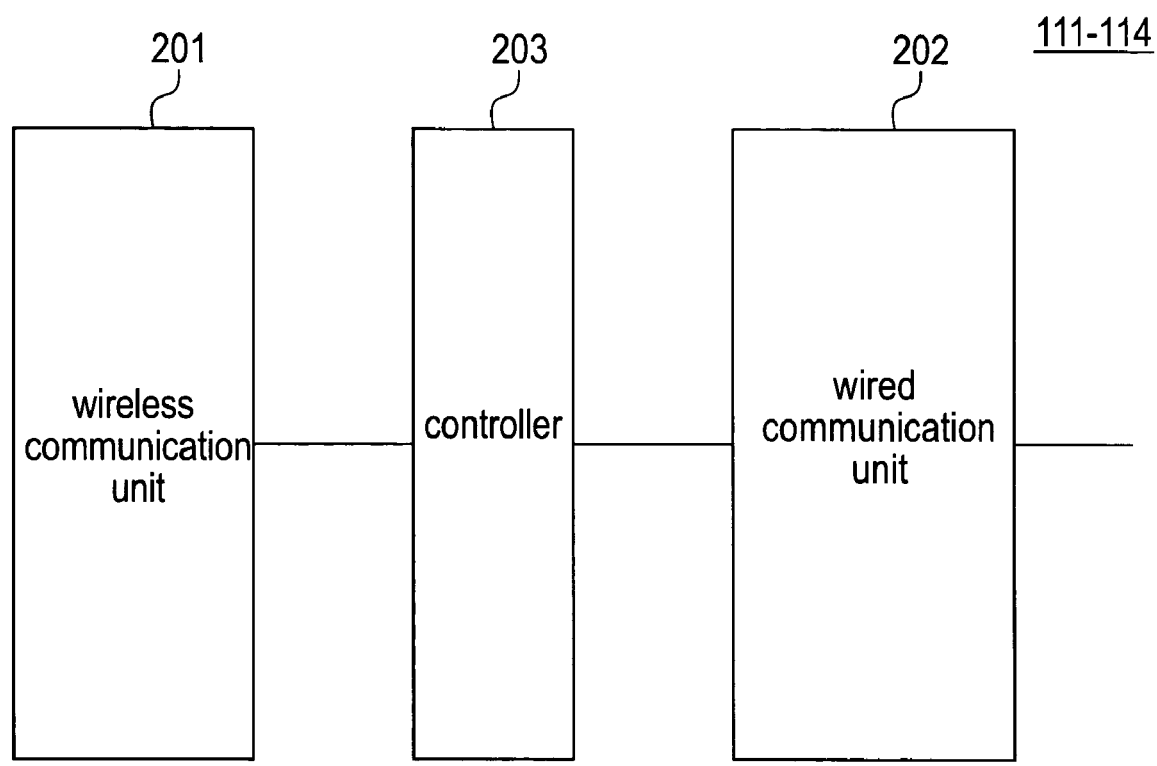
FIG. 2 is a conceptual view of the internal constitution of the wireless base station according to the embodiment.

FIG. 2 schematically shows the internal constitutions of wireless base stations. As shown in FIG. 2, each of the wireless base stations comprises a wireless communication unit 201, a wired communication unit 202, and a controller 203.

The wireless communication unit 201 performs wireless communications with the wireless network terminal 131 located within range of the wireless radio waves. As will be described subsequently, the wireless communication unit 201 measures the radio wave strength of the received radio-waves irrespective of whether or not the destination of the radio waves is the wireless base station itself. The protocol that is used in the communications between the wireless communication unit 201 and the wireless network terminal 131 is not particularly limited. IEEE802.11a, 802.11b, 802.11g or other protocol, for example, can be used.

The network communication unit 202 communicates with network communication units of other wireless base stations via the wired network 121. As described subsequently, the network communication unit 202 sends and receives a terminal management table to and from the network communication units of the other wireless base stations. The communication protocol used by the network communication unit 202 is not particularly limited. TCP/IP can be used, for example.

The controller 203 controls the communication units 201 and 202, creates a terminal management table, and composes the terminal management tables. In addition, the controller 203 executes a relative position identification function, handover function, and load distribution function (described subsequently) (See FIG. 3). The controller 203 is constituted by a CPU (Central Processing Unit), ROM (Read Only Memory), and RAM (Random Access Memory) and so forth, for example. The CPU of the controller 203 executes a program that is stored on the ROM, for example.

Figures 3, 4:
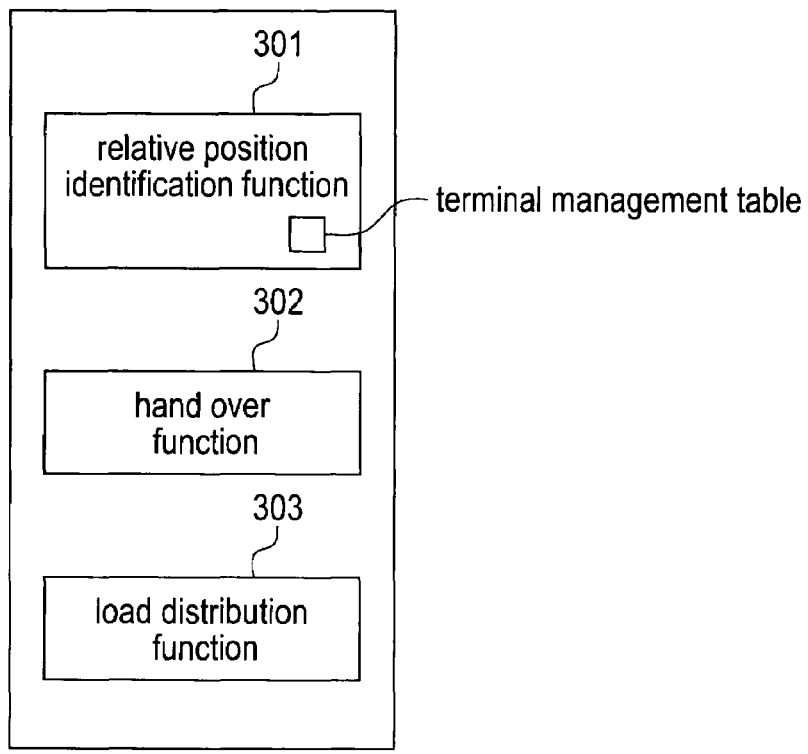
FIG. 3 is a conceptual view of the functional constitution of the wireless base station according to the embodiment.
FIG. 4 is a conceptual view of the data constitution of a terminal management table according to the embodiment.

FIG. 3 schematically shows the functions of the wireless base stations 111 to 114. As shown in FIG. 3, the wireless base stations 111 to 114 according to this embodiment comprise a relative position identification function 301, a handover function 302, and a load distribution function 303. An overview of the functions 301 to 303 will be described hereinbelow.

The relative position identification function 301 is a function that identifies the relative positional relationship of the wireless base stations 111 to 114 by using received radio wave strength information on the wireless base stations. The wireless base stations 111 to 114 measure the strength of the radio waves received from the wireless network terminal 131 at predetermined intervals. Each of the wireless base station 111 to 114 measures not only the radio wave strength of the wireless network terminal 131 that is communicably connected to the wireless base stations 111 to 114 itself but also the radio wave strength of the wireless network terminals connected to other wireless base stations. Further, each of the wireless base station 111 to 114 creates a terminal management table by using the measurement results and stores the terminal management table in an internal memory (not shown).

In a conventional mobile communication system, when the destination of received communication data or voice data is the wireless base station itself, the wireless base station measures the reception strength of the received communication data or voice data and discards the received communication data or voice data without measuring the reception strength thereof when the wireless base station is not the destination of the received communication data or voice data. On the other hand, in the mobile communication system 100 of this embodiment, the wireless base stations 111 to 114 measure the radio wave strength at predetermined intervals even when the wireless base stations 111 to 114 themselves are not the destination of the received communication data and so forth. The intervals of measuring the radio wave strength can be suitably established in accordance with the utilization or other condition of the mobile communication system.

FIG. 4 conceptually shows the data constitution of the terminal management table. As shown in FIG. 4, the terminal management table contains a record access point, a communication access point, the wireless network terminal, the previous measurement time, the previous measured strength, the current measurement time, and the current measured strength. The record access point is information specifying the wireless base station that measured the received radio waves. The communication access point is information specifying the wireless base station that is the destination of the measured radio waves. As information for specifying the access point, a MAC address for specifying each of the wireless base stations on the wired network 121 can be used, for example. The wireless network terminal is information specifying the terminal that transmitted the measured radio waves. The previous measurement time and previous measured strength are the time over which the previous radio wave strength measurement was performed and the measurement result respectively. The current measurement time and current measured strength are the time over which the current radio wave strength measurement is performed and the measurement result respectively.

Each of the wireless base stations 111 to 114 transmit information of the terminal management table to other wireless base stations that belong to the same domain. However, the terminal management table may be transmitted to wireless base stations belonging to other domains in addition to other wireless base stations that belong to the same domain. The wireless base station combines the terminal management tables received from other wireless base stations with its own terminal management table stored in the internal memory. Each of the wireless base station 111 to 114 can create information indicating the relative positional relationship of the wireless base stations 111 to 114 from information on the combined terminal management table. The specific procedure for creating the combined terminal management table will be described subsequently. The combined terminal management table is used by the handover function 302 and load distribution function 303.

The handover function 302 of this embodiment causes the wireless base stations to determine the wireless base station that is newly connected to the wireless network terminal 131.

As mentioned earlier, in a conventional mobile communication system, the wireless network terminal compares the radio wave strength of the probe response signals received from a plurality of wireless base stations and selects the wireless base station corresponding with the strongest radio waves.

On the other hand, in the case of the mobile communication system 100 of this embodiment, the wireless base stations 111 to 114 read the 'current measured strength' corresponding with the respective wireless network terminals 131 at predetermined intervals from the combined terminal management table. In many cases, the radio wave range areas of the wireless base stations 111 to 114 overlap and, therefore, the current measured strength acquired at a plurality of record access points is read. The wireless base stations 111 to 114 select the largest of the current measured strengths and judge the record access point that corresponds with the selected current measured strength. In this embodiment, the wireless base station with the largest current measured strength is known as the 'priority access point'. When the priority access point is the wireless base stations itself, the wireless base station transmits a signal requiring not to transmit a probe response signal to other wireless base stations via the wired network 121.

Processing to determine the priority access point is performed at predetermined intervals. Therefore, there are cases where the priority access point is changed without actually being communicably connected.

When a probe request signal is received, the wireless base station that has been established as the priority access point transmits a probe response signal but the other wireless base stations do not transmit a probe response signal. Therefore, when a probe request signal is transmitted from the wireless network terminal 131, there is only one wireless base station that transmits a probe response signal in one domain. As a result, in many cases, the wireless network terminal 131 receives only one probe response signal. When there is one probe response signal, the wireless network terminal 131 does not need to perform processing to select a wireless base station by comparing radio wave strength. Therefore, in the system of this embodiment, the time required for handover is very short.

On the other hand, when a probe request signal reaches a plurality of wireless base station that belong to different domains, the wireless network terminal 131 receives a plurality of probe response signals. In this case, the wireless network terminal 131 selects a wireless base station by comparing radio wave strength. However, even when probe response signals are received from a plurality of domains, the processing load of the wireless network terminal 131 is far smaller than that of a terminal of a conventional system. This is because there is only one wireless base station that transmits a probe response signal in one domain.

The specific procedure of the handover function 302 will be described subsequently.

The load distribution function 303 of this embodiment switches the communication connection between a wireless base station with a large processing load and the wireless network terminal 131 to a communication connection between a wireless base station with a smaller processing load and the wireless network terminal 131. When the processing load exceeds a predetermined value, the wireless base station searches for other wireless base stations that can be communicably connected to the wireless network terminal 131 by using the combined terminal management table. When a suitable other wireless base station exists, the wireless base station requests a communication connection between the wireless network terminal 131 and another wireless base station. Communication connection switching is executed when one of other wireless base stations complies with the request.

The load distribution function 303 makes it possible to reduce variations in processing load between wireless base stations. By reducing these variations, the operating efficiency of the mobile communication system 100 can be improved. The specific procedure of the load distribution function 303 will be described subsequently.

The specific operation of the mobile communication system 100 of this embodiment will be described next.

The relative position identification function 301 will be described first.

Figure 5:
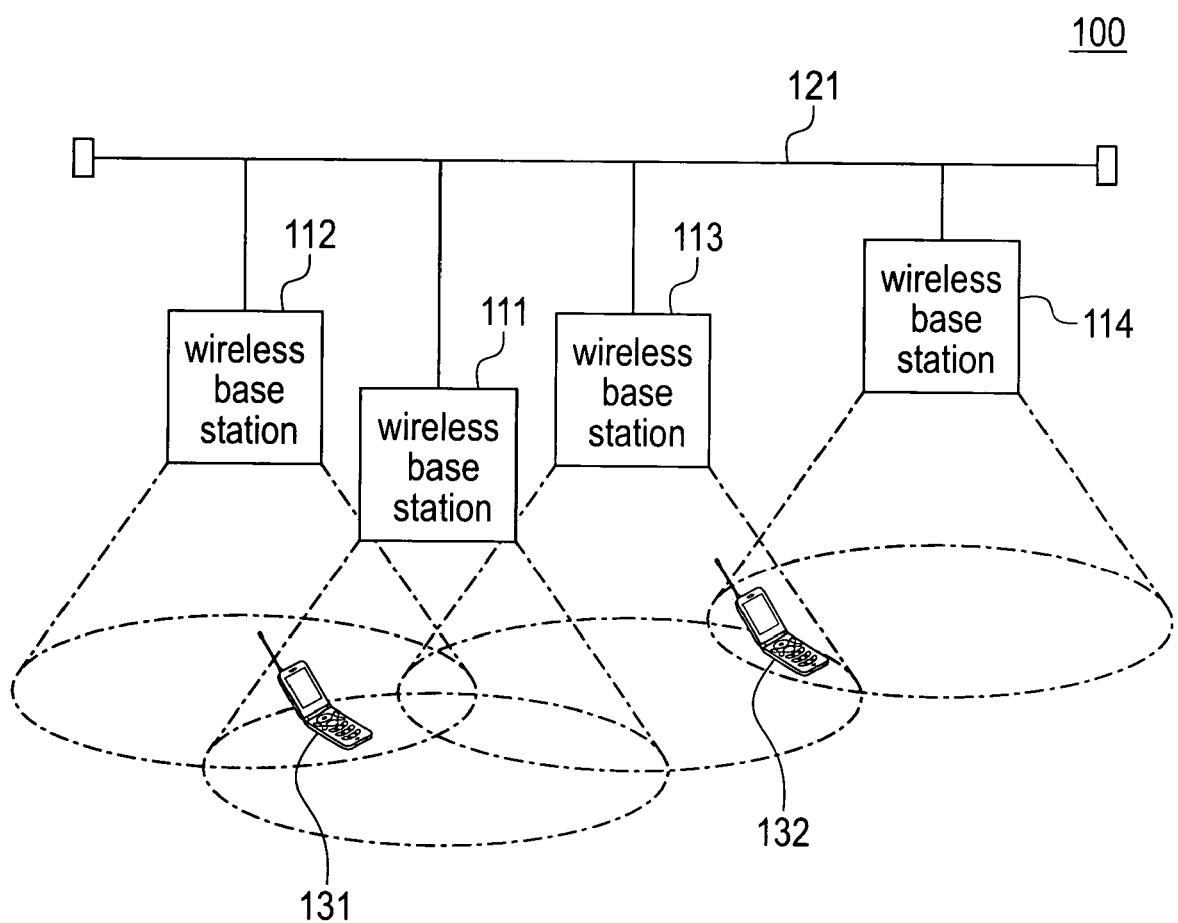

Here, a case where two wireless network terminals 131 and 132 are located in the radio wave range of the mobile communication system 100 as shown in FIG. 5 will be described by way of example. In the example in FIG. 5, the wireless network terminal 131 is located in the radio wave range of the wireless base stations 111, 112, and 113. The wireless network terminal 132 is located in the radio wave range of the wireless base stations 113 and 114.

Figure 6:
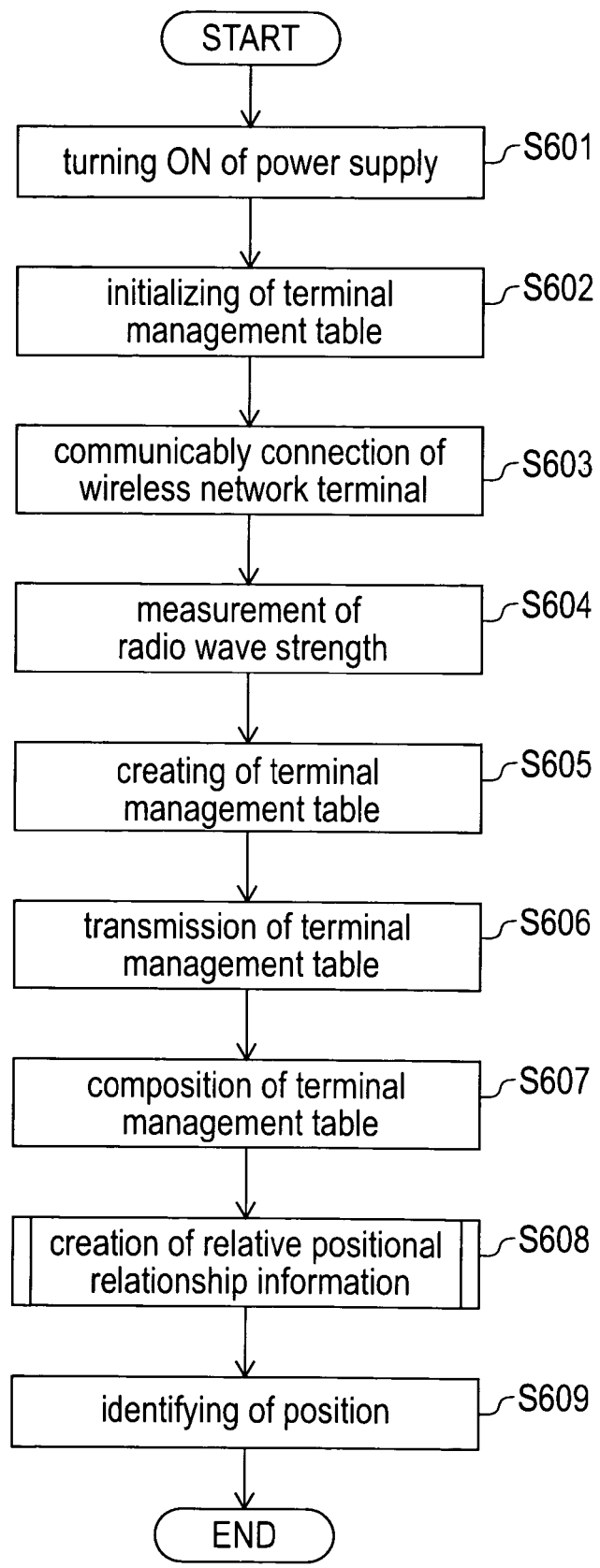

FIG. 6 is a flowchart showing the processing procedure according to the relative position identification function 301.

When the power supply of the wireless base stations 111 to 114 is turned ON (See step S601 in FIG. 6), the terminal management tables stored in the internal memory of the respective wireless base stations 111 to 114 are each initialized (See step S602). Therefore, at this point in time, there is nothing stored in each of the terminal management tables.

When the power supply of the wireless network terminal 131 is turned ON, processing to communicably connect the wireless network terminal 131 to any wireless base station is performed (See step S603). The procedure for selecting a wireless base station immediately after the power supply is turned ON is the same as that of a conventional mobile communication system. In other words, the wireless network terminal 131 transmits a probe request signal, receives a probe response signal from the wireless base stations 111, 112, and 113 in the radio wave range and selects the wireless base station that corresponds with the signal with the strongest radio wave strength among the probe response signals. Likewise, when the power supply of the wireless network terminal 132 is turned ON, processing to communicably connect the wireless network terminal 132 to any wireless base station is performed (See step S603). A case where the wireless network terminal 131 is connected to the wireless base station 111 and the wireless base station 132 is connected to the wireless base station 114 will be described hereinbelow by way of example.

As mentioned earlier, the wireless network terminal 131 is in the radio wave range of the wireless base stations 111, 112, and 113. Therefore, the radio waves transmitted from the wireless network terminal 131 not only reach the wireless base station 111 but also the wireless base stations 112 and 113 (See FIG. 5). Likewise, the radio waves transmitted from the wireless network terminal 132 reach not only the wireless base station 114 but also the wireless base station 113. The wireless base stations 111 to 114 each measure the strength of the received radio waves (See step S604).

In addition, the wireless base stations 111 to 114 create a terminal management table by using the measurement results of the received radio waves and store the terminal management table in the internal memory (See step S605).

FIG. 7 conceptually shows the data structure of the terminal management table stored in the wireless base stations 111 to 114. As mentioned earlier, each of the terminal management table stores the strength of the radio waves that the wireless network terminals 131 and 132 transmit to the wireless base stations itself and the strength of the radio waves transmitted to other wireless base stations.

The wireless base station 111 is within the radio wave range of the wireless network terminal 131 but not within the radio wave range of the wireless network terminal 132. Therefore, the terminal management table created by the wireless base station 111 contains only information relating to radio waves transmitted from the wireless network terminal 131 to the wireless base station 111.

The wireless base station 112 is within the radio wave range of the wireless network terminal 131 but not within the radio wave range of the wireless network terminal 132. Therefore, the terminal management table created by the wireless base station 112 contains only information relating to radio waves transmitted from the wireless network terminal 131 to the wireless base station 112.

The wireless base station 113 is within the radio wave range of the two wireless network terminals 131 and 132. Therefore, the terminal management table created by the wireless base station 113 contains information relating to radio waves transmitted from the wireless network terminal 131 to the wireless base station 113 and radio waves transmitted from the wireless network terminal 132 to the wireless base station 113.

The wireless base station 114 is within the radio wave range of the wireless network terminal 132 but not within the radio wave range of the wireless network terminal 131. Therefore, the terminal management table created by the wireless base station 114 contains only information relating to radio waves transmitted from the wireless network terminal 132 to the wireless base station 114.

Thereafter, each of the wireless base stations 111 to 114 sends the terminal management table stored in the internal memory to the other wireless base stations via the wired network 121 (See step S606). Therefore, the wireless base stations 111 to 114 acquire all of the terminal management tables created by the other wireless base stations.

Each of the wireless base stations 111 to 114 combines the terminal management table created by itself and the terminal management tables created by other wireless base stations (See step S607).

FIG. 8 conceptually shows the data structure of a combined terminal management table. As shown in FIG. 8, the wireless base stations 111 to 114 add radio wave strength information created by the other wireless base stations, in other words, radio wave strength information in which the record access points are other wireless base stations, to their own terminal management tables. Therefore, the terminal management tables stored in the internal memory of the wireless base stations 111 to 114 become the same.

Thereafter, the wireless base stations 111 to 114 use the combined terminal management table to create information showing the relative positional relationship of the wireless base stations 111 to 114 (See step S608) and identify their own position (See step S609).

The procedure of step S608, that is, the procedure for creating information showing the relative positional relationship of the wireless base stations will be described hereinbelow by using FIGS. 9, 10A, and 10B. Although the operation of the wireless base station 111 is described here byway of example, the operation of the other wireless base stations 112 to 114 is the same as that of the wireless base station 111.

Figure 9:
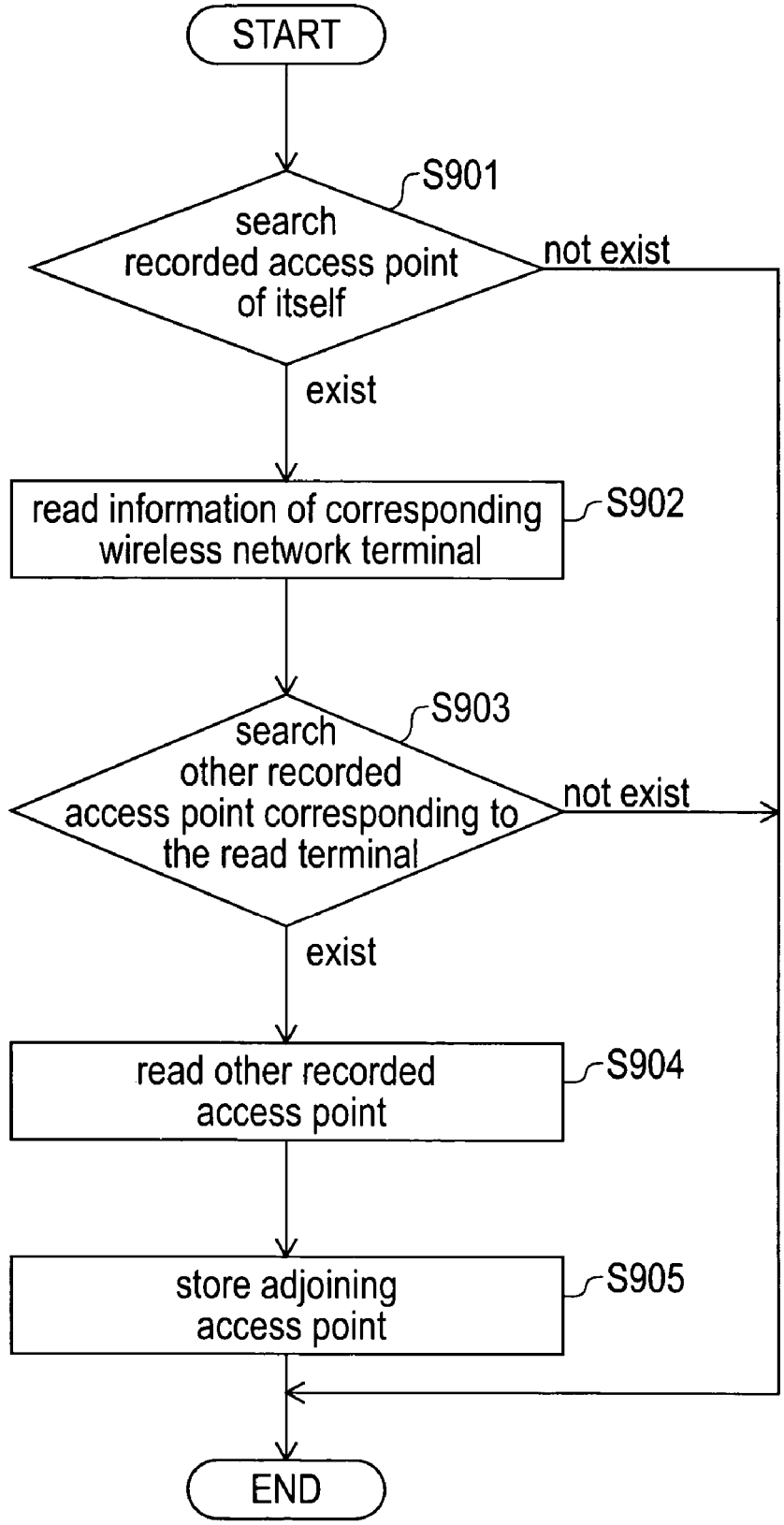

Initially, the wireless base station 111 searches for information that the record access point is the wireless base station 111 itself from the combined terminal management table (See step S901 in FIG. 9). When the relevant information does not exist, the wireless base station ends the processing.

When the information that the record access point is the wireless base station 111 itself exists, the wireless base station 111 reads the wireless network terminal corresponding with the information (See step S902). In the example of FIG. 10A, the record access point of information A is the wireless base station 111. Therefore, the wireless base station 111 reads the identification number of the corresponding wireless network terminal 131.

In addition, the wireless base station 111 searches to determine whether the record access point corresponding with the wireless network terminal 131 exists beyond the wireless base station 111 (See step S903). When the record access point corresponding with the wireless network terminal 131 is only the wireless base station 111, the wireless base station 111 ends the processing.

When other record access points exist, the wireless base station 111 reads other record access points (See step S904). In the example of FIG. 10B, the record access points corresponding with the wireless network terminal 131 are wireless base stations 112 and 113 in addition to the wireless base station 111 (See codes B and C in FIG. 10B). Therefore, the wireless base station 111 reads the identification numbers of the wireless base stations 112 and 113.

It is clear from the above processing that the radio wave range of the wireless base station 111 overlaps the radio wave range of the wireless base stations 112 and 113. In the present application, the overlapping of radio wave ranges is termed 'adjoining'. The fact that the wireless base station 111 adjoins the wireless base stations 112 and 113 is stored as relative positional information (See step S905).

Figure 11:
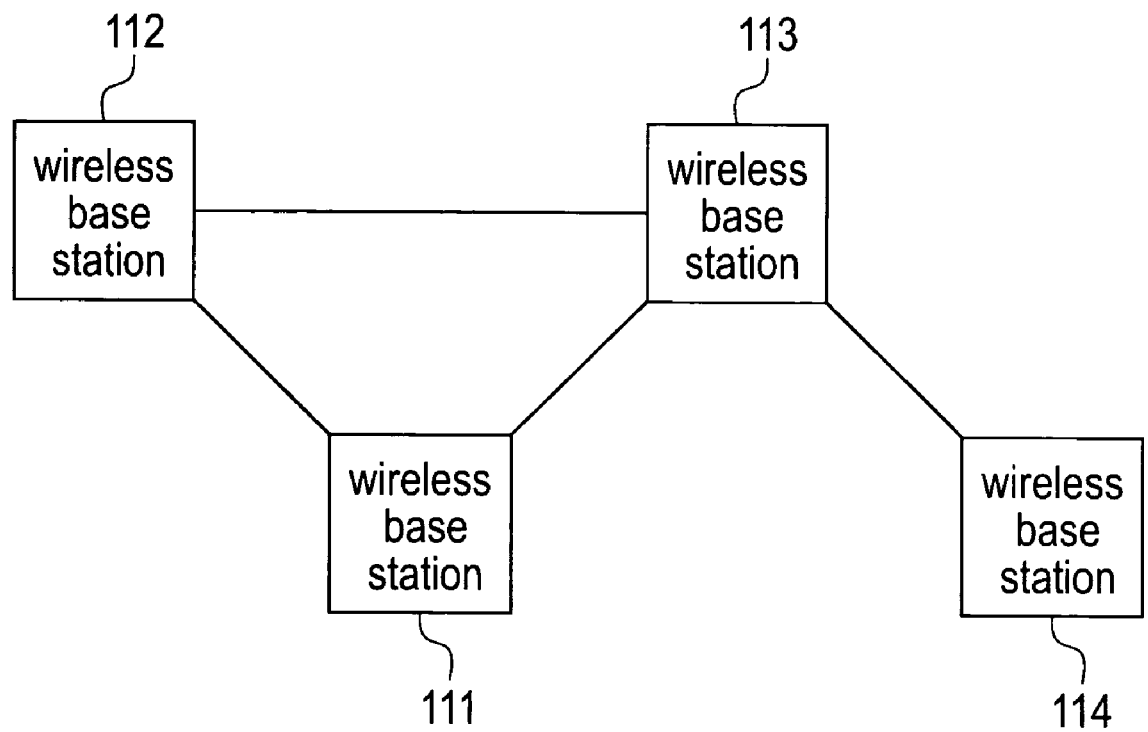

By repeating the processing shown in FIGS. 9, 10A and 10B, the relative positional information of each wireless base stations 111 to 114 can be obtained. An example of the acquired relative positional information is conceptually shown in FIG. 11. As shown in FIG. 11, the wireless base stations 111, 112, and 113 adjoin one another. The wireless base station 114 adjoins the wireless base station 113 but does not adjoin the wireless base stations 111 and 112.

Figure 12:
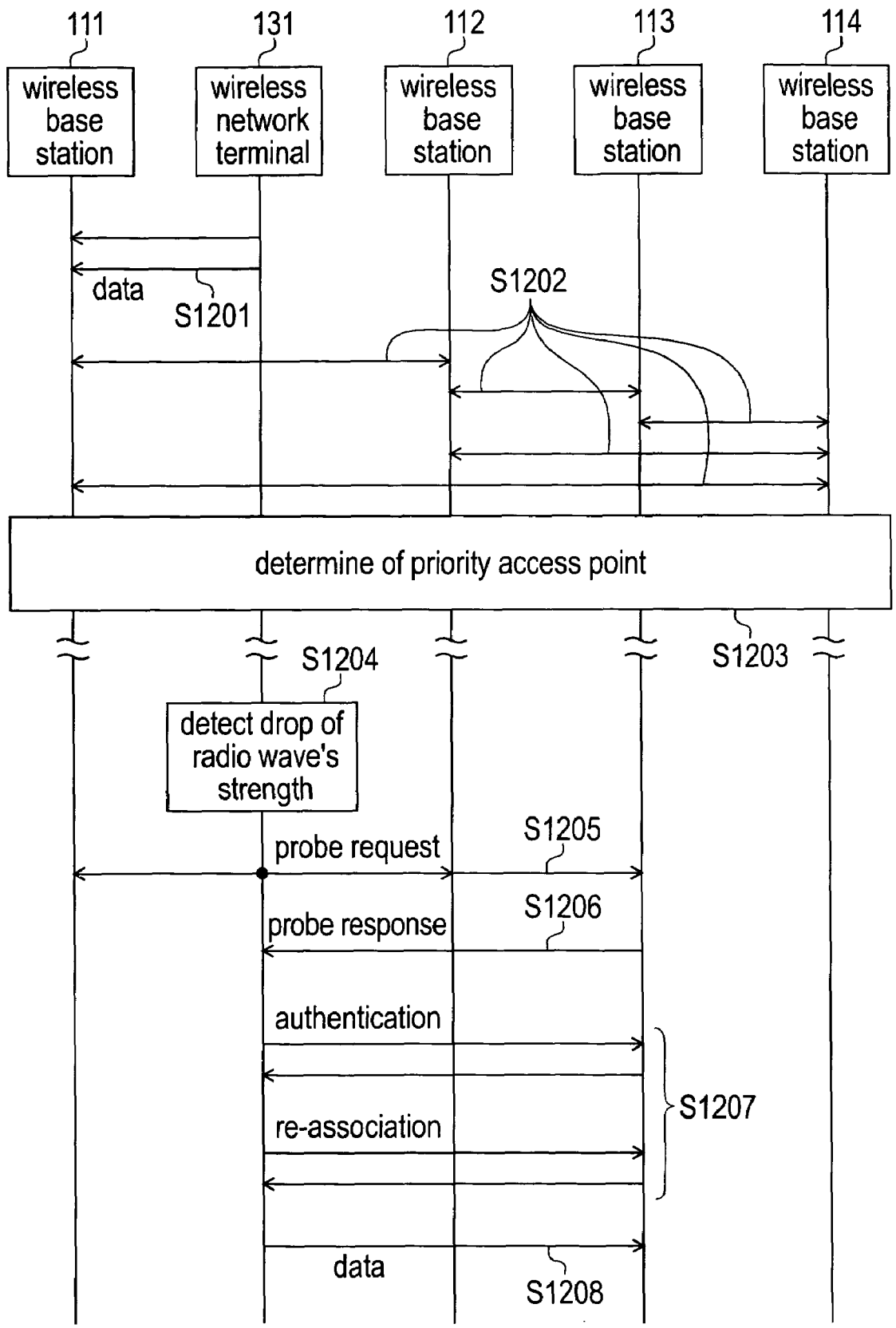
FIGS. 12 and 13 serve to illustrate the handover function of the mobile communication system according to the embodiment.

The specific operation of the handover function 302 (See FIG. 3) will be described next. FIG. 12 is a conceptual diagram showing the procedure of the handover function 302.

In the example of FIG. 12, the wireless network terminal 131 is communicably connected to the wireless base station 111 (See step S1201). As mentioned earlier, sometimes the radio waves transmitted from the wireless network terminal 131 reach not only the wireless base station 111 but also the adjoining wireless base stations 112 and 113. The wireless base stations 112 and 113 measure the strength of the radio waves received from the wireless network terminal 131 and create the terminal management table (See steps S604, S605 in FIG. 6 and FIG. 7).

The wireless base stations 111 to 114 each transmit the terminal management tables to the other wireless base stations (step S1202 in FIG. 12 and step S606 in FIG. 6). As a result, the combined terminal management table shown in FIG. 8 is obtained (See step S607 in FIG. 6).

The wireless base stations 111 to 114 execute processing to determine the priority access point by using their own combined terminal management tables (See step S1203 in FIG. 12). This processing can be performed each time a terminal management tables are received from other wireless base stations, that is, each time a new combined terminal management tables are created, for example. However, in this embodiment the cycle for performing this processing is not limited. The processing to determine the priority access point is performed by reading all of the 'current measured strengths' of the wireless network terminal 131 from its own combined terminal management table and judging the record access point corresponding with the largest 'current measured strength', as mentioned earlier. However, at that point in time, the wireless base stations connected to the wireless network terminal 131, that is, the wireless base station corresponding with the communication access point is not selected as the priority access point. In the example of FIG. 12, the wireless base station 111 is not selected as the priority access point.

When the priority access point is determined, it is possible that the 'previous measured strength' and 'current measured strength' are compared for each data item and the wireless base stations for which the radio wave strength has decreased are removed from the selection targets. As a result, it is to be expected that the frequency with which the handover processing is performed will be reduced. Whether removal of the wireless base stations that employ the 'previous measured strength' is performed is optional.

When the priority access point is the wireless base station itself, the wireless base station transmits the determination result to the other wireless base stations in the same domain. However, the determination result may be transmitted to all the other wireless base stations in the mobile communication system 100 or may be transmitted to wireless base stations in the same domain and in adjoining domains.

Upon receipt of the determination result, other wireless base stations change the internal settings so that a probe response signal is not transmitted when a probe request signal is received from the corresponding wireless network terminal 131. However, when a wireless base station determines in the next priority access point determination processing that it is itself the priority access point, the wireless base station changes its settings to transmit a probe response signal to the wireless network terminal 131.

When the wireless network terminal 131 moves, the strength of the radio waves that communicably connect the terminal 131 and the wireless base station 111 sometimes drops (See step S1204). When the radio wave strength drops below a predetermined threshold value, the wireless network terminal 131 transmits a probe request signal (See step S1205). The probe request signal is received by the wireless base stations 111, 112, and 113 that are located within the radio wave range of the wireless network terminal 131.

As mentioned earlier, the wireless base station which is the priority access point is set to transmit a probe response signal and other wireless base stations are set not to transmit a probe response signal. In the example of FIG. 12, the priority access point is the wireless base station 113. Therefore, the wireless base station 113 transmits a probe response signal to the wireless network terminal 131 (See step S1206). On the other hand, the wireless base stations 111 and 112 are not the priority access point and therefore do not transmit a probe response signal regardless of whether they receive the probe request signal. The wireless base station 114 does not receive a probe request signal and does not transmit a probe response signal.

The wireless network terminal 131 measures the radio wave strength of the probe request signal received from the wireless base station 113. As mentioned earlier, there is only one wireless base station that transmits a probe response signal in each domain. When the determination result of the priority access point is transmitted to all the wireless base stations in the mobile communication system 100 or when the determination result of the priority access point is transmitted to the wireless base stations in the adjoining domains, and so forth, there is only one wireless base station that transmits a probe response signal in total. Therefore, the processing load of the wireless network terminal 131 when handover is performed is very small and, therefore, the processing time is also short. In the example in FIG. 12, the wireless network terminal 131 receives a probe response signal from only the wireless base station 113.

Finally, authentication and re-association are performed between the wireless network terminal 131 and wireless base station 113 (See step S1207).

As described hereinabove, the handover processing ends and the communications between the wireless network terminal 131 and the wireless base station 113 start (See step S1208).

Figure 13:
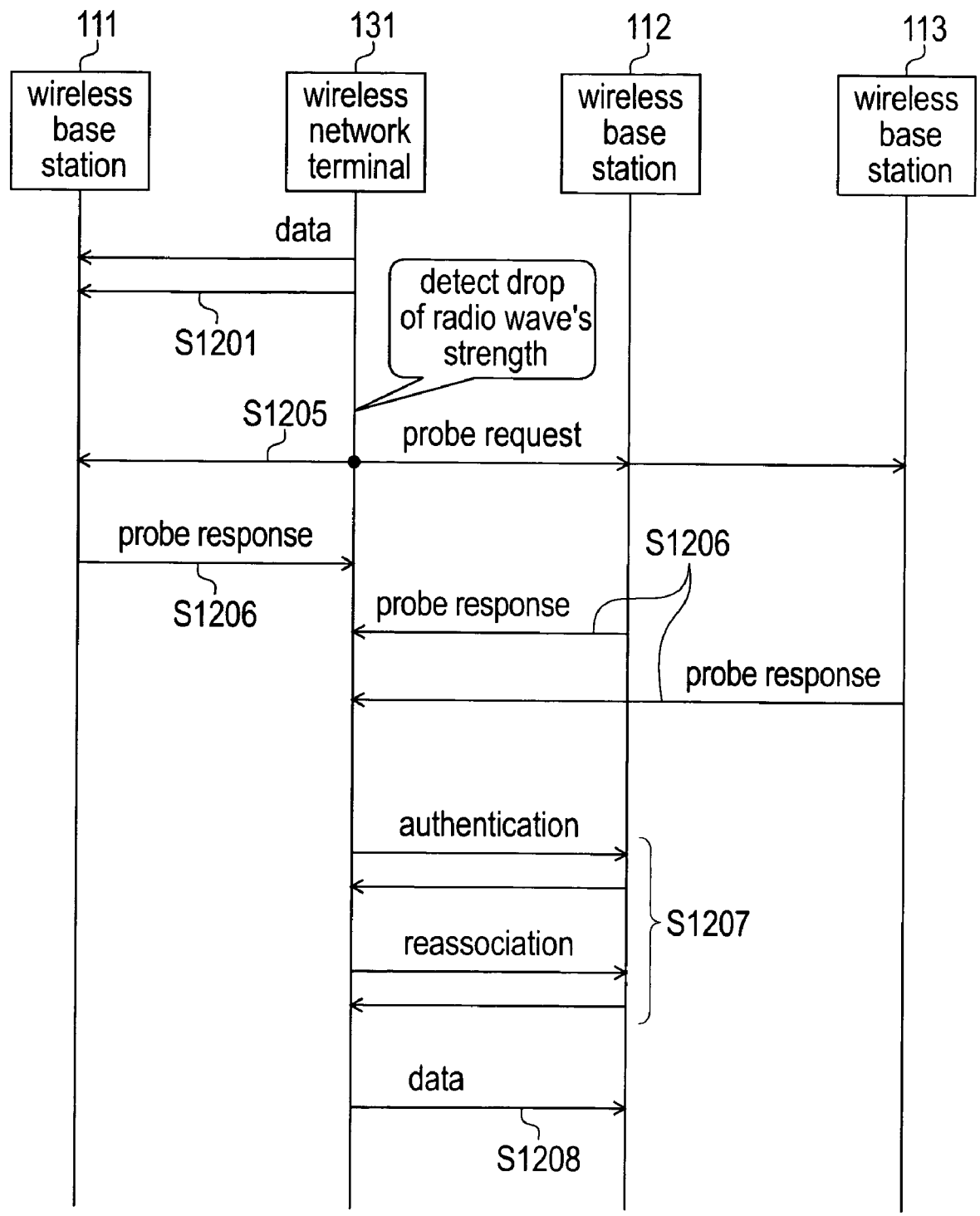

FIG. 13 shows an example of handover processing in a mobile communication system in which the selection of a priority access point is not performed. FIG. 13 is a comparative example to facilitate understanding of the mobile communication system 100 of this embodiment and is not prior art. The step numbers shown in FIG. 13 each correspond with the same step numbers in FIG. 12.

In the handover processing of FIG. 13, priority access point determination processing (See steps S1202 and 1203 in FIG. 12) is not performed. Therefore, wireless base stations always transmit a probe response signal upon receipt of a probe request signal apart from when there is a communicable connection with the wireless network terminal 131 at this point in time. In the example in FIG. 13, both the wireless base stations 112 and 113 transmit a probe response signal. As mentioned earlier, the wireless network terminal 131 measures the radio wave strength of all the received probe response signals. As a result, the processing load of the wireless network terminal 131 when handover is performed is very large and, therefore, the processing time is also long.

As described above, the handover function 302 of this embodiment makes it possible to shorten the time required for handover because the wireless base station determines the priority access point by using a combined terminal management table.

The specific procedure of the load distribution function 303 (See FIG. 3) will be described next by using FIGS. 14 to 16.

Figures 14, 15:
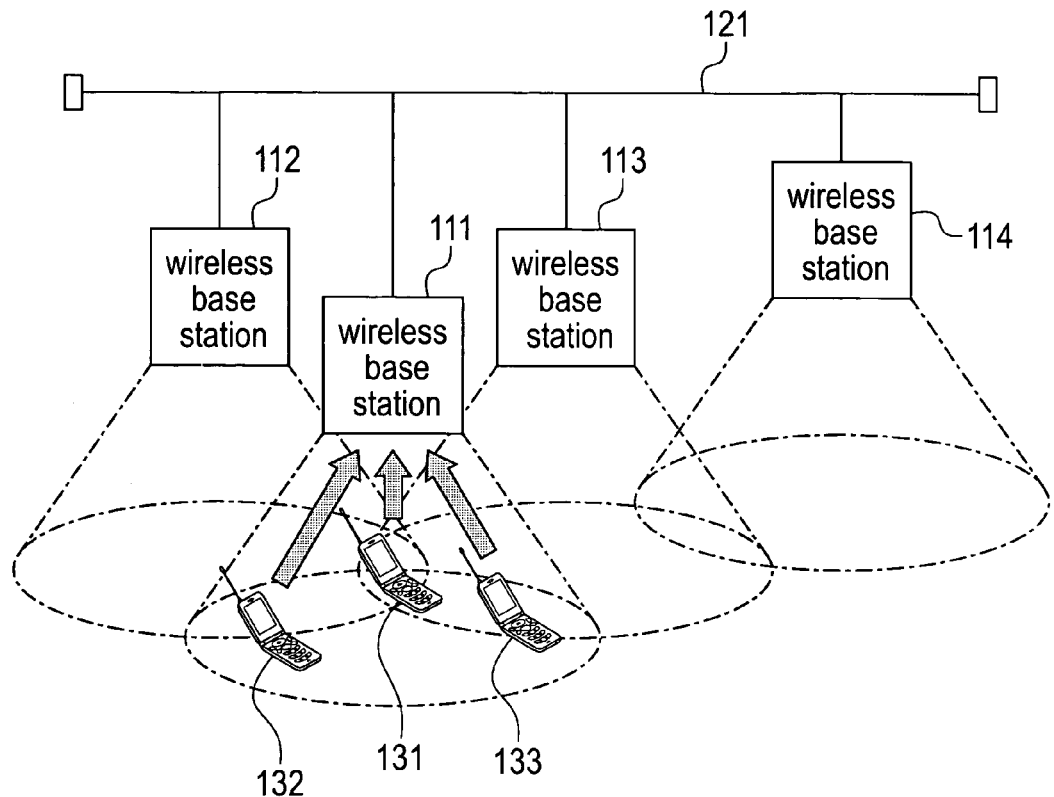

Here, as shown in FIG. 14, a case where three wireless network terminals 131, 132 and 133 are located within the radio wave range of the mobile communication system 100 is described by way of example. In the example of FIG. 14, the wireless network terminal 131 is located within the radio wave range of the wireless base stations 111, 112, and 113. The wireless network terminal 132 is located within the radio wave range of the wireless base stations 111 and 112. The wireless base station 133 is located within the radio wave range of the wireless base stations 111 and 113. The wireless network terminals 131 to 133 are all communicably connected to the wireless base station 111.

FIG. 15 shows a combined terminal management table that is stored in the wireless base stations 111 to 114. As mentioned earlier, the combined terminal management tables that are stored in the respective wireless base stations 111 to 114 are the same. As shown in the record access point field in FIG. 15, in the case of the wireless network terminal 131, the radio wave strength is measured by the wireless base stations 111, 112, and 113, in the case of the wireless network terminal 132, the radio wave strength is measured by the wireless base stations 111 and 112 and, in the case of the wireless network terminal 133, the radio wave strength is measured by the wireless base stations 111 and 113.

FIG. 16 is a conceptual view showing the procedure of the load distribution function 303.

As mentioned earlier, the wireless network terminals 131 to 133 are each communicably connected to the wireless base station 111 (See step S1601).

When load distribution processing is performed, the wireless base station 111 first selects a wireless network terminal that should be switched to a connection with another wireless base station. For this purpose, the wireless base station 111 specifies the wireless network terminal with the smallest 'current measured strength' from among the terminals 131 to 133 connected to the wireless base station 111 by using the combined terminal management table (See step S1602). In the example in FIG. 15, the smallest value of the 'current measured strength' for which the record access point is the wireless base station 111 is −70 dBm. Further, this measured strength is the strength of the radio waves received from the wireless network terminal 132. Therefore, the wireless network terminal 132 is chosen as the switching terminal.

Thereafter, the wireless base station 111 uses the combined terminal management table to search for other wireless base stations that can be communicably connected to the wireless network terminal 132 (See step S1603). When the sought for wireless base stations do not exist, the wireless base station 111 ends the processing. When there is one sought for wireless base station, the wireless base station 111 selects the wireless base station as the priority access point. On the other hand, when a plurality of wireless base stations is sought for, the wireless base station 111 selects any one wireless base station as the priority access point. The method for selecting the priority access point from among a plurality of wireless base stations is not especially limited. For example, the wireless base station with the largest 'current measured strength' of the radio waves transmitted from the wireless network terminal 132 can be selected as the priority access point. When a priority access point is selected from among a plurality of wireless base stations, the 'previous measured strength' and 'current measured strength' are compared for each data item and the wireless base stations for which the radio wave strength decreases can be removed from the selection targets. As a result, it is to be expected that the frequency with which the handover processing is performed will be reduced. Whether removal of the wireless base stations using the 'previous measured strength' is performed is optional.

In the examples of FIGS. 14 and 15, the wireless network terminal 132 is within the radio wave range of the wireless base station 112 but not within the radio wave range of the wireless base stations 113 and 114. Therefore, the wireless base station 111 selects the wireless base station 112 as the priority access point.

The wireless base station 111 transmits a connection request to the wireless base station 112 and transmits a connection rejection request to the wireless base stations 113 and 114 (See step S1604). The connection rejection request may be sent to wireless base stations belonging to other domains in addition to the wireless base stations 113 and 114. Upon receipt of the connection request, the wireless base station 112 establishes itself as the priority access point. Further, upon receipt of the connection rejection request, the other wireless base stations 113 and 114 change their internal settings to not transmit a probe response signal when a probe request signal is received from the corresponding wireless network terminal 132.

Thereafter, when the communication connection between the wireless base station 111 and wireless network terminal 132 is broken (See step S1605), a probe request signal is transmitted from the wireless network terminal 132 (See step S1606).

The probe request signal is received by the wireless base stations 111 and 112 that are located within the radio wave range of the wireless network terminal 132. The wireless base station 112 is the priority access point and, therefore, transmits a priority response signal (See step S1607).

Thereafter, authentication and re-association are performed between the wireless network terminal 132 and wireless base station 112 (See step S1608).

As mentioned earlier, the load distribution processing ends and communications between the wireless network terminal 132 and wireless base station 112 starts (See step S1609).

The wireless base station 111 checks its own communication load after the connection with the wireless network terminal 132 is broken (See step S1601). When the reduction in the load is insufficient, load distribution processing of the other wireless network terminals is performed.

Although a communication connection between the terminal 132 and the base station 112 is made after breaking the communications between the wireless network terminal 132 and wireless base station 111 in the example of FIG. 16, the broking may be performed after the connecting, furthermore, the broking and connecting may be performed at the same time.

An example in which wireless base stations are mutually connected by the wired network 121 was described in this embodiment but the present invention can be applied to a network in which wireless base stations are wirelessly connected and a network in which wireless base stations are connected by using a wired connection and a wireless connection.

More detailed positional information can be created by adding the absolute positional relationship between the wireless base stations to the relative position identification function 301 of this embodiment.

When the handover function 302 and load distribution function 303 do not perform removal process of the wireless base stations using the 'previous measured strength', there is no need to include the 'previous measured strength' in the terminal management table.

Although terminal management tables are mutually provided between the wireless base stations 111 to 114 belonging to the same domain in this embodiment, terminal management tables can also be mutually provided between all the wireless base stations that belong to the mobile communication system 100. Further, terminal management tables can also be mutually provided between wireless base stations that belong to adjoining domains.

As described hereinabove, in the case of the mobile communication system 100 according to this embodiment, terminal management tables are created by each of the wireless base stations and combined terminal management tables are created by mutually exchanging the terminal management tables. As a result, the mobile communication system 100 of this embodiment is able to identify mutual relative positions (See FIG. 11 and so forth).

In addition, the mobile communication system 100 of this embodiment is able to determine, on the wireless base station side, the wireless base stations that are newly connected by handover by using the combined terminal management table. Therefore, the handover processing time of the mobile communication system 100 is short and, therefore, a break in communications is not readily produced.

Furthermore, the mobile communication system 100 of this embodiment is able to distribute the load when variations in the load are large between a plurality of adjoining wireless base stations. As a result, the operating efficiency of a wired network can be improved.

What is claimed is:

1. A mobile communication system, comprising:
   a wireless base station that measures the strength of radio waves received from a wireless terminal irrespective of whether or not the destination of the radio waves is the wireless base station itself;
   a communication network that communicably connects between said wireless base station and other wireless base stations; and
   a controller that creates a terminal management table that contains identification information on said wireless base station itself that measures the radio wave strength, identification information on said wireless base station corresponding to the destination of the radio waves, identification information on said wireless terminal that transmits the radio waves, and the radio wave strength measurement result, and that combines the terminal management table thus created and terminal management tables received from said other wireless base stations by using said communication network, wherein the controller has a relative position identification function that identifies the relative positional relationship of a plurality of wireless base stations by using the combined terminal management table, wherein the controller searches data in which identification information on the wireless base station that measured the radio wave strength is self-identification information, from the combined terminal management table;
   reads identification information on the wireless terminal from the searched data;
   reads data containing the read wireless terminal identification information from the combined terminal management table;
   reads identification information on the wireless base station that measured the radio wave strength from the data thus read; and
   judges that the wireless base station corresponding with the wireless base station identification information thus read is an adjoining wireless base station.

2. A mobile communication system, comprising:
   a wireless base station that measures the strength of radio waves received from a wireless terminal irrespective of whether or not the destination of the radio waves is the wireless base station itself;
   a communication network that communicably connects between said wireless base station and other wireless base stations; and
   a controller that creates a terminal management table that contains identification information on said wireless base station itself that measures the radio wave strength, identification information on said wireless base station corresponding to the destination of the radio waves, identification information on said wireless terminal that transmits the radio waves, and the radio wave strength measurement result, and that combines the terminal management table thus created and terminal management tables received from said other wireless base stations by using said communication network, wherein the controller has a handover function that determines a priority access point that is newly connected during handover of the wireless terminal by using the combined terminal management table, the controller reads all of the radio wave strength measurement results of the corresponding wireless terminal from the combined terminal management table; specifies the largest radio wave strength from the measurement results thus read; and determines the wireless base station that measured the specified radio wave strength as the priority access point.

3. The mobile communication system according to claim 2, wherein
   the controller removes data according to which the newest measurement result is smaller than the previous measurement result, from the measurement result thus read; and
   specifies the largest radio wave strength from the measurement results that are not removed.

4. The mobile communication system according to claim 2, wherein a wireless base station that determines that the wireless base station itself is the priority access point transmits, to the other wireless base stations, a signal requesting that a probe response signal not be transmitted upon receipt of a probe request signal from the wireless terminal.

5. The mobile communication system according to claim 4, wherein the request signal is transmitted to all the wireless base stations in the same domain.

6. The mobile communication system according to claim 5, wherein the request signal is transmitted to wireless base stations in adjoining domains.

7. The mobile communication system according to claim 2, wherein the request signal is transmitted to all the wireless base stations that belong to the same mobile communication system.

8. The mobile communication system according to claim 2, wherein the priority access point is determined each time a new combined terminal management table is created.

9. The mobile communication system according to claim 2, wherein the priority access point is determined in a predetermined cycle.

10. A mobile communication system, comprising:
a wireless base station that measures the strength of radio waves received from a wireless terminal irrespective of whether or not the destination of the radio waves is the wireless base station itself;
a communication network that communicably connects between said wireless base station and other wireless base stations; and
a controller that creates a terminal management table that contains identification information on said wireless base station itself that measures the radio wave strength, identification information on said wireless base station corresponding to the destination of the radio waves, identification information on said wireless terminal that transmits the radio waves, and the radio wave strength measurement result, and that combines the terminal management table thus created and terminal management tables received from said other wireless base stations by using said communication network, wherein the controller has a load distribution function that switches the communication connection between the corresponding wireless base station and the wireless terminal to a communication connection between another wireless base station and the wireless terminal, wherein the controller selectes the wireless terminal for which the measurement result is smallest; searches another wireless base station that can be communicably connected to the selected wireless terminal; and selects the searched wireless base station as the wireless base station that is communicably connected to the wireless terminal.

11. The mobile communication system according to claim 10, wherein the controller executes the load distribution function when the processing load of the corresponding wireless base station is larger than a predetermined value.

12. The mobile communication system according to claim 10, wherein, when a plurality of wireless base stations are selected, the controller communicably connects the wireless terminal and the wireless base station for which the measurement result is largest.

13. The mobile communication system according to claim 10, wherein the controller removes the wireless base station for which the newest judgment result is smaller than the previous measurement result, from the searched wireless base stations; and
selects the wireless base station for which the newest measurement result is largest from the wireless base stations that are not removed as the wireless base station that is communicably connected to the wireless terminal.

14. The mobile communication system according to claim 10, wherein the controller transmits, to the selected wireless base station, a signal requesting that a probe response signal be transmitted upon receipt of a probe request signal from the wireless terminal.

15. The mobile communication system according to claim 10, wherein the controller transmits, to the wireless base stations that are not selected, a signal requesting that a probe response signal not be transmitted upon receipt of a probe request signal from the wireless terminal.

* * * * *